(12) United States Patent
Lee et al.

(10) Patent No.: US 7,487,812 B2
(45) Date of Patent: *Feb. 10, 2009

(54) SUBSTRATE BONDING APPARATUS FOR LIQUID CRYSTAL DISPLAY DEVICE AND METHOD FOR FABRICATING THE SAME

(75) Inventors: Sang Seok Lee, Taegu-Kwangyokshi (KR); Sang Ho Park, Pusan-Kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/917,342

(22) Filed: Aug. 13, 2004

(65) Prior Publication Data

US 2005/0011606 A1    Jan. 20, 2005

Related U.S. Application Data

(63) Continuation of application No. 10/259,368, filed on Sep. 30, 2002, now Pat. No. 6,793,756.

(30) Foreign Application Priority Data

Mar. 22, 2002   (KR) .......................... 10-2002-15643
Mar. 25, 2002   (KR) .......................... 10-2002-15966

(51) Int. Cl.
    *B32B 37/00*   (2006.01)
(52) U.S. Cl. ...................... 156/381; 156/580
(58) Field of Classification Search ................ 156/228, 156/285, 286, 381, 382, 580, 581, 583.1
See application file for complete search history.

(56) References Cited

U.S. PATENT DOCUMENTS

| | | | |
|---|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,539,545 A | 7/1996 | Shimizu et al. |
| 5,548,429 A | 8/1996 | Tsujita |
| 5,680,189 A | 10/1997 | Shimizu et al. |

(Continued)

FOREIGN PATENT DOCUMENTS

EP            1003066           5/2000

(Continued)

*Primary Examiner*—James Sells
(74) *Attorney, Agent, or Firm*—McKenna Long & Aldridge LLP

(57) ABSTRACT

A substrate bonding apparatus includes a bonding chamber, lower and upper stages positioned at lower and upper spaces at an interior of the bonding chamber, respectively, the lower stage including a first receiving part, a first lifting system having a first support part for supporting a first substrate, the first receiving part receiving the first support part within the lower stage, and a blowing system formed in the first support part to blow air through the first support part.

23 Claims, 11 Drawing Sheets

U.S. PATENT DOCUMENTS

| | | | |
|---|---|---|---|
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,016,181 A | 1/2000 | Shimada | |
| 6,219,126 B1 | 4/2001 | Von Gutfeld | |
| 6,232,023 B1 * | 5/2001 | Matsuki et al. | 430/22 |
| 6,236,445 B1 | 5/2001 | Foschaar et al. | |
| 6,304,311 B1 | 10/2001 | Egami et al. | |
| 6,337,730 B1 | 1/2002 | Ozaki et al. | |
| 6,508,289 B2 * | 1/2003 | Hagai | 156/443 |
| 6,793,756 B2 * | 9/2004 | Lee et al. | 156/228 |
| 2001/0021000 A1 | 9/2001 | Egami et al. | |
| 2001/0027840 A1 * | 10/2001 | Hagai | 156/245 |
| 2002/0008838 A1 | 1/2002 | Matsuda | |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-232451 | 9/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | 07-326598 A | 12/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-041376 | 2/1998 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-066163 * | 3/2000 |
| JP | 2000-66163 | 3/2000 |
| JP | 2000-66165 | 3/2000 |
| JP | 2000-137235 | 5/2000 |
| JP | 2000-147528 | 5/2000 |
| JP | 2000-183130 | 6/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-305059 A | 11/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-176947 A | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-282126 | 10/2001 |
| JP | 2001-305563 | 10/2001 |
| JP | 2001-2381675 | 10/2001 |
| JP | 2001-2381678 | 10/2001 |
| JP | 2001-330837 | 11/2001 |
| JP | 2001-330840 | 11/2001 |

| | | | | | | |
|---|---|---|---|---|---|---|
| JP | 2001-356353 | 12/2001 | | JP | 2002-122872 | 4/2002 |
| JP | 2001-356354 | 12/2001 | | JP | 2002-122873 | 4/2002 |
| JP | 2002-14360 | 1/2002 | | JP | 2002-139734 | 5/2002 |
| JP | 2002-23176 | 1/2002 | | JP | 2002-202512 | 7/2002 |
| JP | 2002-49045 | 2/2002 | | JP | 2002-202514 | 7/2002 |
| JP | 2002-82340 | 3/2002 | | JP | 2002-214626 | 7/2002 |
| JP | 2002-90759 | 3/2002 | | KR | 2000-35302 | 6/2000 |
| JP | 2002-90760 | 3/2002 | | | | |
| JP | 2002-107740 | 4/2002 | | | | |

* cited by examiner

SUBSTRATE BONDING APPARATUS FOR LIQUID CRYSTAL DISPLAY DEVICE AND METHOD FOR FABRICATING THE SAME

This is a continuation of application Ser. No. 10/259,368, filed on Sep. 30, 2002, now U.S. Pat. No. 6,793,756.

The present invention claims the benefit of Korean Patent Application Nos. P2002-15643 filed in Korea on Mar. 22, 2002, and P2002-15966 filed in Korea on Mar. 25, 2002, which are hereby incorporated by references.

BACKGROUND OF THE INVENTION

1. Field of the Invention

The present invention relates to a bonding apparatus, and more particularly, to a substrate bonding apparatus for manufacturing a liquid crystal display device and a method for driving the substrate bonding apparatus.

2. Discussion of the Related Art

In response to an increasing demand for various types of displays devices, flat panel type displays such as liquid crystal display (LCD), plasma display panel (PDP), electro-luminescent display (ELD), and vacuum fluorescent display (VFD) have been developed. In particular, LCD devices have been commonly used because of their high resolution, light weight, thin profile, and low power consumption. In addition, LCD devices have been implemented in mobile devices, such as monitors for notebook computers, and for monitors of computers and televisions. Accordingly, efforts to improve image quality of LCD devices contrast with benefits of their high resolution, light weight, thin profile, and low power consumption. In order to incorporate LCD devices as a general image display, image qualities such as fineness, brightness, large-sized area, for example, must be maintained.

Processes for manufacturing LCD devices according to the related art may be divided into two different categories: liquid crystal injection and liquid crystal dropping. The liquid crystal injection method includes steps of forming a sealant pattern on one of the first and second substrates to form an injection inlet, bonding the first and second substrates to each other within a vacuum processing chamber, and injecting liquid crystal material through the injection inlet. The liquid crystal dropping method, which is disclosed in Japanese Patent. Application No. 11-089612 and 11-172903, includes steps of dropping liquid crystal material on a first substrate, arranging a second substrate over the first substrate, and moving the first and second substrates to join to each other, thereby bonding the first and second substrates to each other.

Compared to the liquid crystal injection method, the liquid crystal dropping method is advantageous in that various process steps, such as forming a liquid crystal material injection inlet, injecting the liquid crystal material, and sealing the injection inlet are unnecessary since the liquid crystal material is predisposed on the first substrate.

FIG. 1 is a cross sectional view of a substrate bonding device prior to a deposition process according to the related art. In FIG. 1, the substrate assembly device includes a frame 10, an upper stage 21, a lower stage 22, a sealant dispenser (not shown), a liquid crystal material dispenser 30, a processing chamber including an upper chamber unit 31 and a lower chamber unit 32, a chamber moving system 40, and a stage moving system 50. The chamber moving system 40 includes a driving motor driven to selectively move the lower chamber unit 32 to a first location where outflow of sealant and dropping of liquid crystal material occur, and a second location where the bonding process is performed. The stage moving system 50 includes another driving motor driven to selectively move the upper stage 21 along a vertical direction perpendicular to the upper and lower stages 21 and 22.

FIG. 2 is a cross sectional view of the substrate bonding device prior to a bonding process according to the related art. In FIG. 2, a process of manufacturing a liquid crystal display device using the substrate assembly device according to the related art includes loading a second substrate 52 onto the upper stage 21 and loading a first substrate 51 onto the lower stage 22, as shown in FIG. 1. Then, the lower chamber unit 32 having the lower stage 22 is moved to a first processing location by the chamber moving system 40 for sealant and liquid crystal material dispensing. Subsequently, the lower chamber unit 32 is moved to a second processing location for substrate bonding by the chamber moving system 40. Thereafter, the upper and lower chamber units 31 and 32 are assembled together by the chamber moving system 40 to form a vacuum tight seal, and a pressure in the chamber is reduced by a vacuum generating system (not shown), as shown in FIG. 2.

Then, the upper stage 21 is moved downward by the stage moving system 50 at the vacuum state to closely fasten the second substrate 52 fixed to the upper stage 21 to the first substrate 51 fixed to the lower stage 22. Furthermore, the process for bonding the respective substrates to each other is carried out through a continuous pressurization, thereby completing the manufacture of the LCD device. Thus, after the bonding of the substrates is completed, the upper and lower chamber units 31 and 32 are separated from each other, and the lower chamber unit 32 is moved to an unloading position by the chamber moving system 40, and the bonded substrates are unloaded.

However, the substrate assembly device according to the related art is problematic. First, the substrate assembly device according the related art fails to provide a subsidiary system for stable loading of the substrates onto the upper and lower stages, or unloading the bonded substrates from the lower stage, thereby increasing the probability that the substrates may be damaged during the loading/unloading process. Specifically, the bonded substrates may partially adhere to an upper surface of the lower stage during the bonding process. Then, the substrate assembly device according the related art unloads the bonded substrates without considering whether the substrates have adhered to the lower stage, thereby creating a high probability that damage to the substrates may occur.

Second, the bonded substrates must be unloaded without droop within a central or circumferential portions of the bonded substrates. However, since the substrate assembly device according to the related art does not consider such the droop, an increase in probability that failure due to warpage of the bonded substrates may occur. Specifically, considering that the size of LCD devices are increasing to meet demand, preventing droop during unloading of the bonded substrates is extremely important and necessary.

Third, direct contact between the substrate and the stage causes static electricity to be generated, which may breakdown inner circuits formed on the substrate. In addition, direct contact between the substrates and the stages lowers production yield.

Fourth, in the substrate assembly device according to the related art, the second substrate is loaded on the lower stage of the lower chamber unit, is transferred into a position of the upper stage by the chamber moving system to be loaded on the upper stage, and the lower chamber unit is again moved to load the first substrate on the lower stage. Accordingly, a high possibility that the substrates may be loaded at incorrect locations exists and thus misalignment may occur during loading thereof, thereby increasing the probability that the substrates may be broken.

SUMMARY OF THE INVENTION

Accordingly, the present invention is directed to a substrate bonding apparatus for manufacturing a liquid crystal display device and method for driving the substrate bonding apparatus that substantially obviates one or more problems due to limitations and disadvantages of the related art.

An object of the present invention is to provide a substrate bonding apparatus for manufacturing a liquid crystal display device and method for driving the bonding device in which an air-blowing system is incorporated to the lift bar system to prevent static electricity generated between the substrate and the stage, and to prevent scratches due to the friction of the substrate, whereby the substrate is aligned at a precise position when being mounted on the stage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended claims.

To achieve these and other advantages and in accordance with the purpose of the present invention, as embodied and broadly described, a substrate bonding apparatus includes a bonding chamber, lower and upper stages positioned at lower and upper spaces at an interior of the bonding chamber, respectively, the lower stage including at least one receiving part, a lifting system having a first support part for supporting a first substrate mounted on the lower stage and a receiving part for receiving the first support part along a vertical direction inside the receiving part, and a blowing system formed in the first support part to blow air through the first support part.

In another aspect, a substrate bonding apparatus for bonding first and second substrates includes a bonding chamber, lower and upper stages positioned at lower and upper spaces at an interior of the bonding chamber, respectively, a lifting system for lifting a first substrate onto the lower stage and unloading bonded substrates off of the lower stage, and a clamping system for clamping and aligning the first substrate on the lower stage and unloading the bonded substrates from the lower stage.

In another aspect, a method for driving a substrate bonding apparatus comprising a bonding chamber provided with upper and lower stages, a lifting system for lifting a substrate, and a clamping system for clamping the substrate, the method includes steps of placing the substrate at a first position on one of the lifting system and the clamping system, and moving the clamping system to align the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
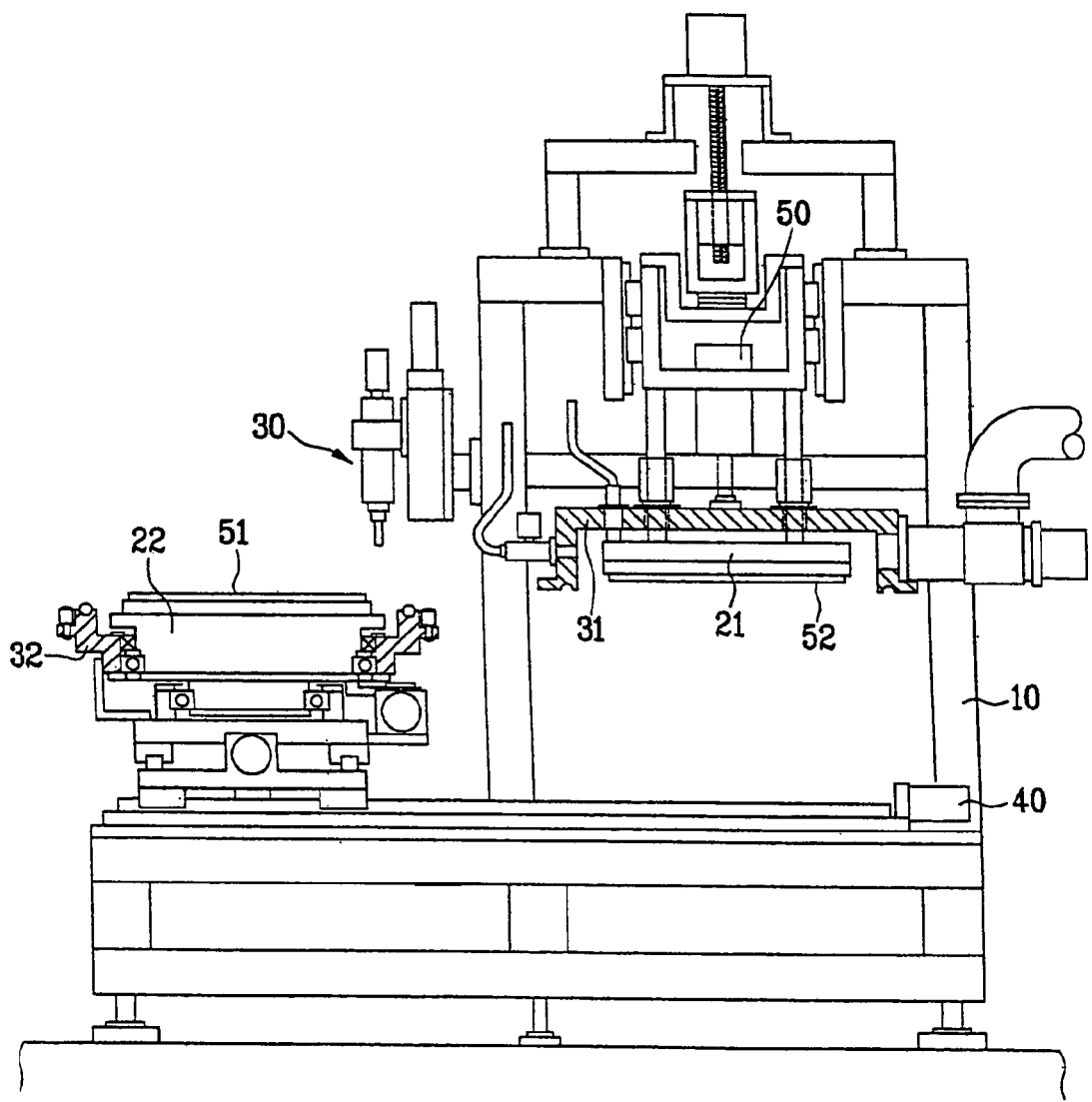
FIG. 1 is a cross sectional view of a substrate bonding device prior to a deposition process according to the related art.
Figure 2:
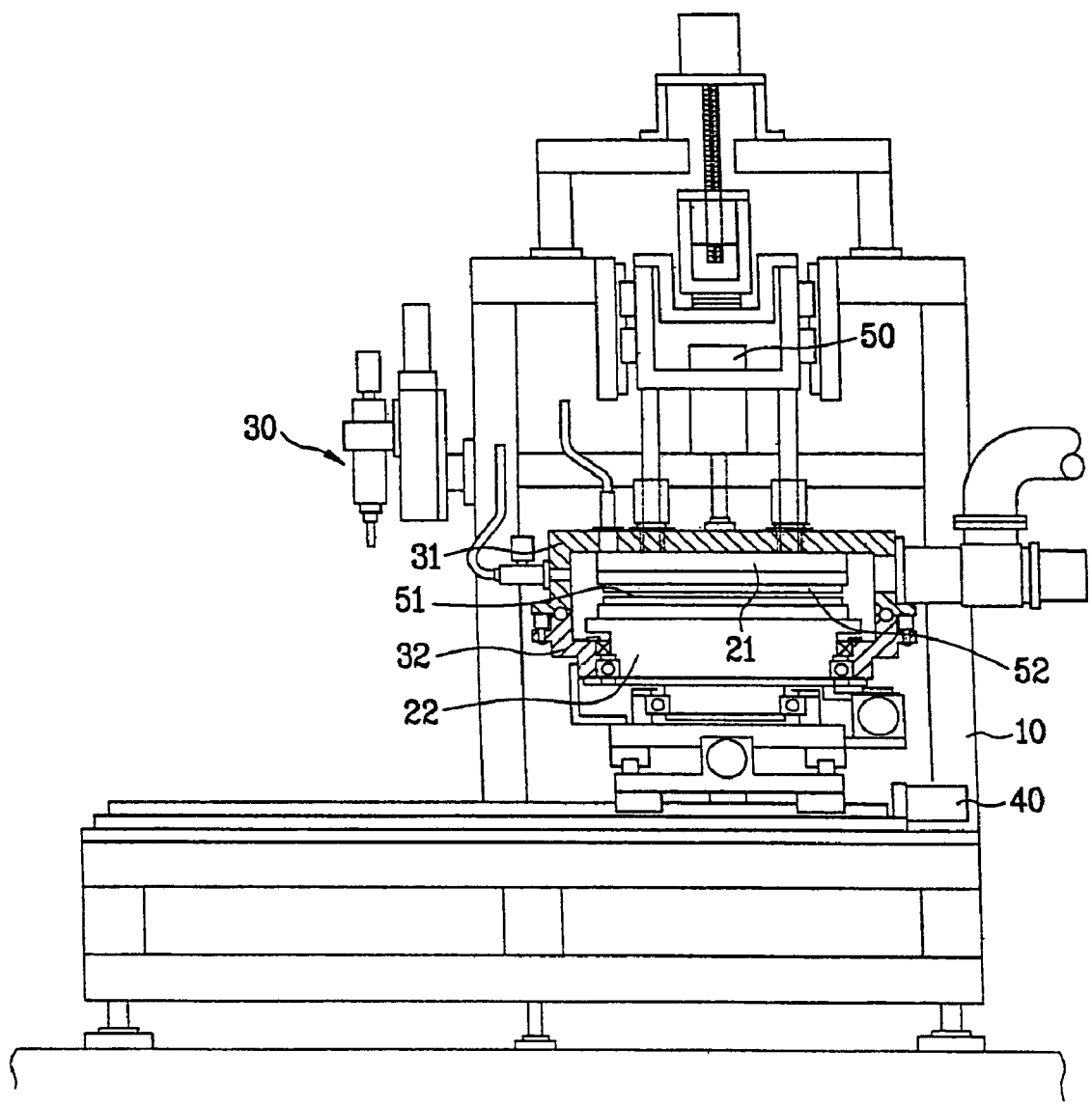
FIG. 2 is a cross sectional view of the substrate bonding device prior to a bonding process according to the related art.
Figure 3:
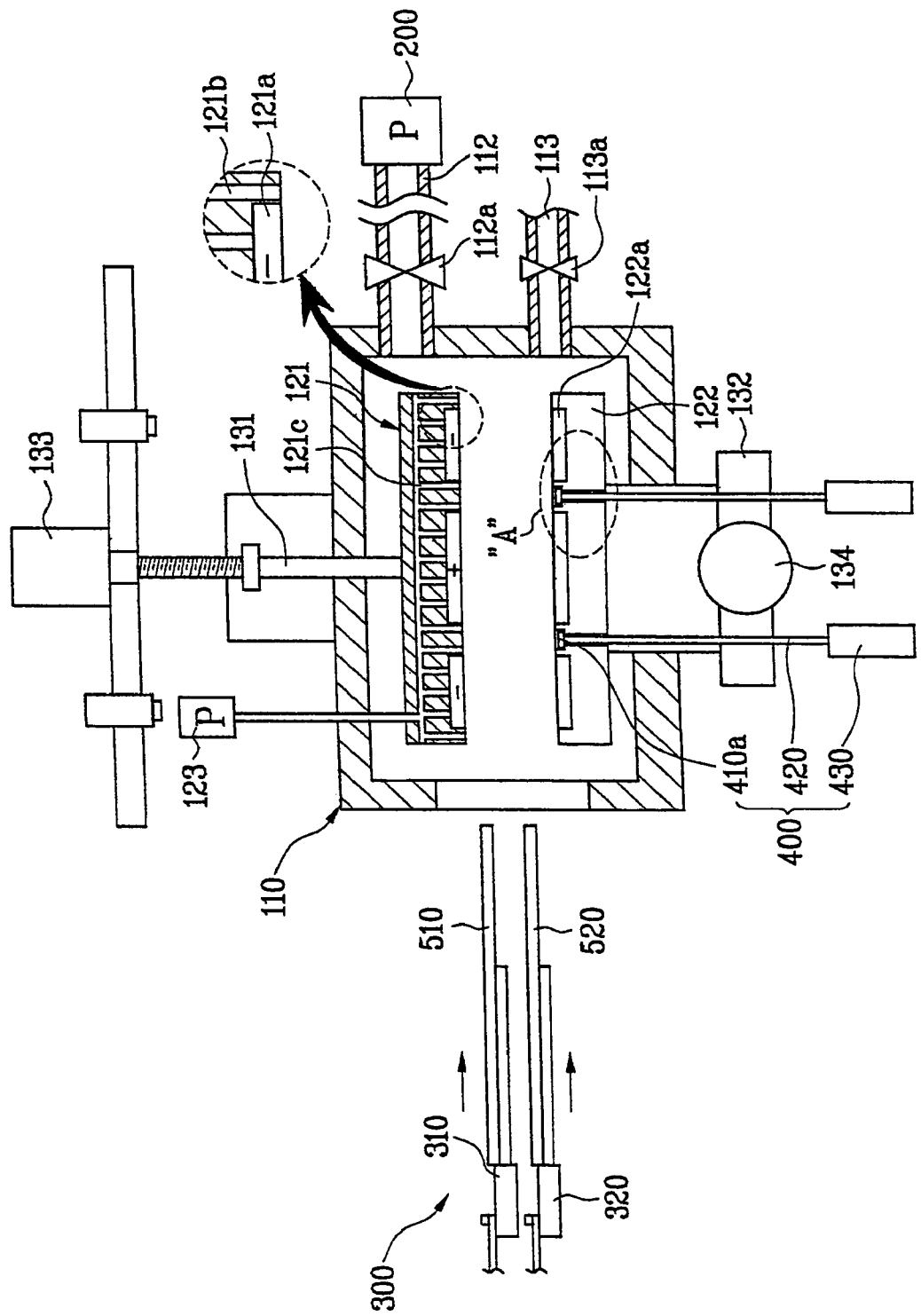
FIG. 3 is a cross sectional view of an exemplary a substrate bonding apparatus according to the present invention.

FIG. 3 is a cross sectional view of an exemplary a substrate bonding apparatus according to the present invention. In FIG. 3, a substrate bonding apparatus for a liquid crystal display may include a bonding chamber 110, upper and lower stages 121 and 122, a stage moving unit, a vacuum unit 200, a loader part 300, a substrate lifting system 400, and a clamping system.

The bonding chamber 110 may include a structure suitable for performing a bonding process between respective substrates. The bonding chamber 110 may include a single chamber structure have an entry door (not shown). Alternatively, the bonding chamber 110 may include upper and lower portions (not shown) that may facilitate loading/unloading of the respective substrates. Both the upper and lower portions may move along both vertical and horizontal directions. Alternatively, a first one of the upper and lower portions may be stationary and a second one of the upper and lower portions may move along the vertical and horizontonal directions. The bonding chamber 110 may be provided with an air exhaust tube 112 for reducing a pressure in an interior of the bonding chamber 110 via the vacuum unit 200. In addition, the bonding chamber 110 may include a vent tube 113 for returning the bonding chamber 110 to an atmospheric state by introducing air or other gas ($N_2$) from an exterior of the bonding chamber 110. The air exhaust tube 112 and the vent tube 113 may be provided with valves 112a and 113a, respectively, for selectively opening and closing respective passageways.

The upper and lower stages 121 and 122 may confront each other at upper and lower spaces in the interior of the bonding chamber 110. The lower and upper stages 122 and 121 may electrostatically adsorb the first and second substrates 510 and 520. Specifically, the upper stage 121 may be provided with an electrostatic chuck 121a and a plurality of vacuum holes 121b formed along a circumference of the electrostatic chuck 121a. The electrostatic chuck 121a may be constructed with at least one pair of electrostatic plates each having opposite polarities. Alteratively, the electrostatic chuck 121a may be constructed to provide an electrostatic force using a pair of electrostatic plates each having similar polarities. In addition, the vacuum holes 121b communicate with each other through a unitary pipe line or a plurality of pipe lines 121c to receive a vacuum force generated by a vacuum pump 123 connected to the upper stage 121.

Figure 5A:
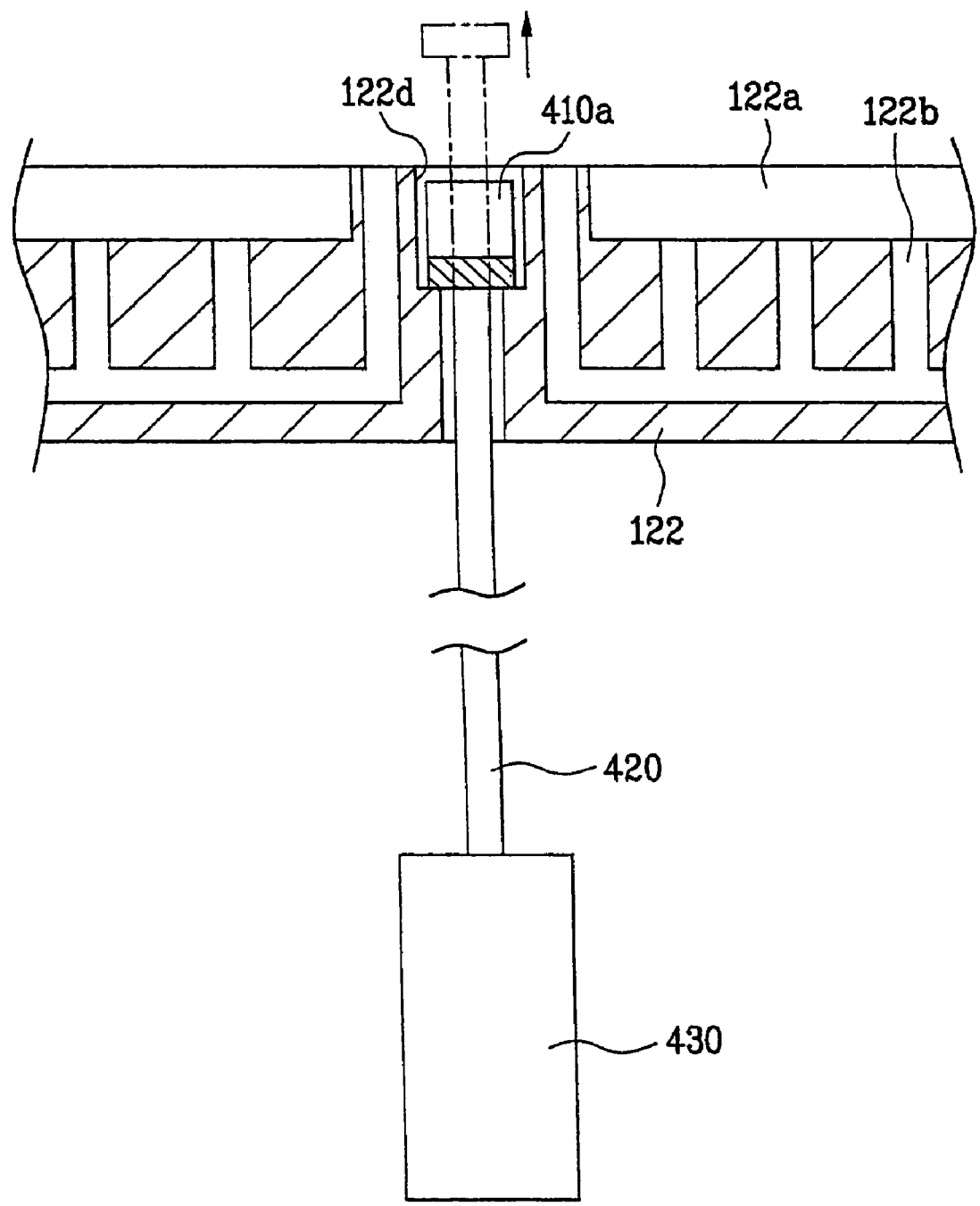
FIG. 5A is a cross sectional view of a portion "A" of FIG. 3 according to the present invention.

Likewise, the lower stage 122 may also be provided with at least one electrostatic chuck 122a at an upper portion thereof, and at least one vacuum hole formed along a circumference of the electrostatic chuck 122a. Alternatively, as shown in FIG. 5A, an arrangement of the electrostatic chuck 122a and vacuum holes 122b formed at the upper surface of the lower stage 122 may not be limited to the arrangement of the electrostatic chuck 121a and the plurality of vacuum holes 121b formed at the bottom surface of the upper stage 121. The electrostatic chuck 122a and the plurality of vacuum holes 122b arranged at the upper surface of the lower stage 122 may be changed to accommodate a geometry of a target substrate and corresponding liquid crystal dispensing areas. However, the plurality of vacuum holes 122b formed at the upper surface of the lower stage 122 may not be necessary.

Figure 4:
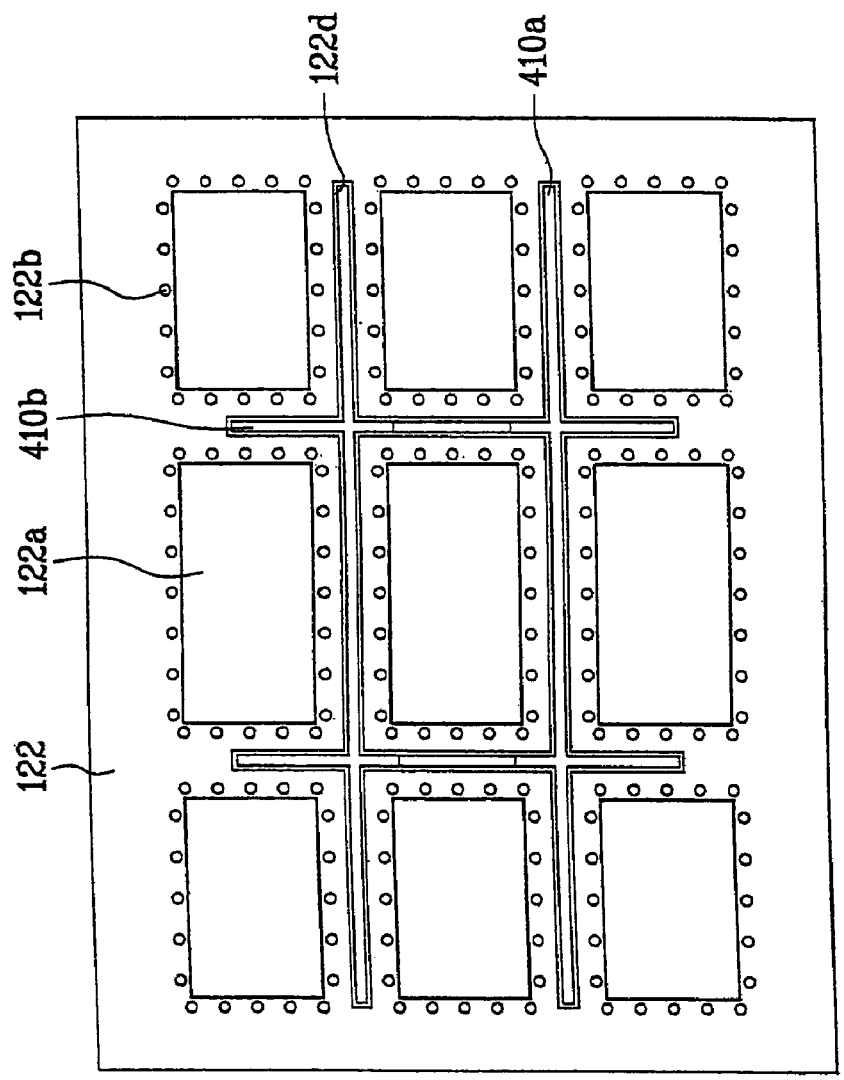
FIG. 4 is a plan view of an exemplary lower stage and a substrate lifting system according to the present invention.
Figure 4:
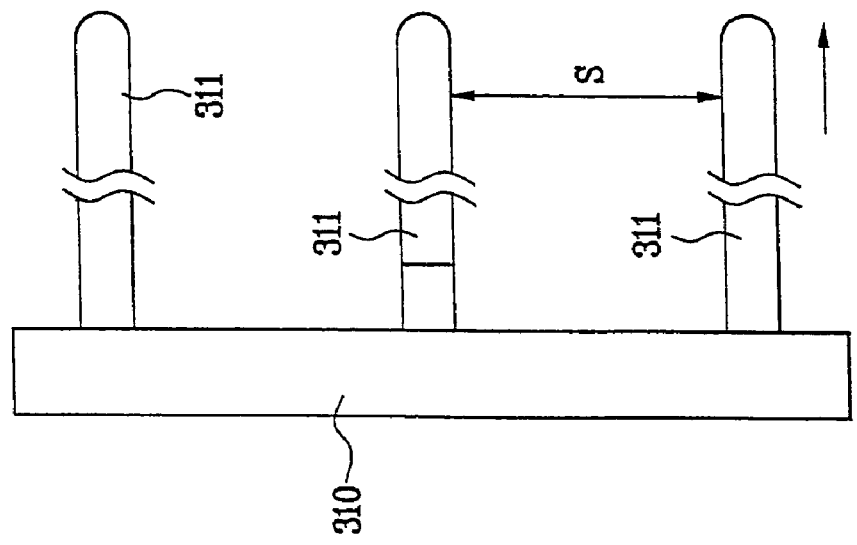

FIG. 4 is a plan view of an exemplary lower stage and a substrate lifting system according to the present invention. In FIG. 4, at least one first receiving part 122d may be formed at a first portion of the upper surface of the lower stage 122 that corresponds to a dummy area of a first substrate (not shown) that may be placed on the upper surface of the lower stage 122. The location of the first receiving part 122d may be positioned at other portions of the upper surface of the lower stage 122 to prevent droop of the first substrate (not shown). For example, the first receiving part 122d may be formed at a portion corresponding to a bottom region of the dummy area located between adjacent cell areas formed on an upper surface of the first substrate. Alternatively, the first receiving part 122d may have a geometry corresponding to a recess or a penetrating hole formed through the lower stage 122. In addition, the first receiving part 122d may be constructed as a recessed slot having a penetrating hole formed only at specific portions of the recessed slot.

In FIG. 3, the upper stage moving system may include an upper driving motor 133 axially coupled with the upper stage 121 by a moving axis 131. The lower stage moving system may include a lower driving motor 134 axially coupled with the lower stage 122 by a rotational axis 132. The upper and lower driving motors 133 and 134 may be arranged at the exterior or the interior of the bonding chamber 110 to selectively drive the respective axes 131 and 132.

The vacuum unit 200 may transfer an adsorptive force to the interior of the bonding chamber 110 such that the bonding chamber 110 selectively forms a vacuum state at the interior thereof. The vacuum unit 200 may include an adsorptive pump for generating the adsorptive force, and a space provided by the vacuum unit 200 communicates with the air exhaust tube 112 of the bonding chamber 110.

The loader part 300 may be arranged as a separate system from the bonding chamber 110 provided with various elements therein. The loader part 300 may be arranged at the exterior of the bonding chamber 110 to selectively load respective substrates into the interior of the bonding chamber 110 or unload the same from the interior of the bonding chamber 110. The loader part 300 may include a first arm 310 to convey a first substrate 510 upon which a liquid crystal material is dropped, and a second arm 320 to convey a second substrate 520 upon which a sealant is dispensed.

In FIG. 3, the substrate lifting system 400 may be arranged at the interior of the bonding chamber 110. Alternatively, the substrate lifting system 400 may be arranged at both the exterior and interior of the bonding chamber 110. The substrate lifting system 400 may include first support parts 410a selectively received at an interior of the first receiving part 122d (in FIG. 4) and selectively supporting the first substrate 510, an elevating axis 420 connected to the first support part 410a, extending through the first receiving part 122d from the lower stage 122, and for moving the first support parts 410a up and down, and a driving part 430 connected to the elevating axis 420, for driving the elevating axis 420 to ascend or descend.

The first receiving part 122d may be formed along a lengthwise direction at a first portion of the upper surface of the lower stage 122 that corresponds to a dummy area of the first substrate 510 in a direction that is the same as the loading/unloading direction of the first substrate 510, and the first support parts 410a may be formed along the lengthwise direction to correspond to the configuration of the first receiving part 122d. Accordingly, the first support part 410a may stably support even peripheral portions, thereby preventing droop of the peripheral portions when the lifting system is applied to apparatuses for manufacturing a large-sized liquid crystal display.

However, the configuration of the first receiving part 122d and the first support parts 410a may be changed. For example, the first support parts 410a may be formed with a plurality of protrusions at the upper surface of the first support parts 410a, so as to decrease a contact area with the substrate. In addition, the at least two first receiving parts 122d and the at least two first support parts 410a may be formed along a longest side of the lower stage 122, the at least two first support parts 122d and the at least two first support parts 410a may be formed along the shortest side of the lower stage 122, and the at least one first receiving part 122d and the at least one first support part 410a may be formed along the longest side and the shortest side of the lower stage 122, respectively.

Specifically, the first receiving part 122d and the first support part 410a may be arranged along another direction different from the direction as the loading/unloading direction of the first substrate 510. For example, at least one of the first receiving part 122d and the first support part 410a may be arranged along a direction perpendicular to the loading/unloading direction of the first substrate 510 to form any one of various patterns as viewed from the top, such as "=", "≡", "||", "#", "|||", thereby preventing droop of both sides of the first substrate 510.

In particular, any supporting location (or contact location) of the first substrate 510 by the first support parts 410a may be allowed if the location assists in preventing the droop of the first substrate 510. It may be preferred that the location be positioned at the bottom surface of the dummy area between cells formed on the upper surface of the first substrate 510.

Figure 5B:
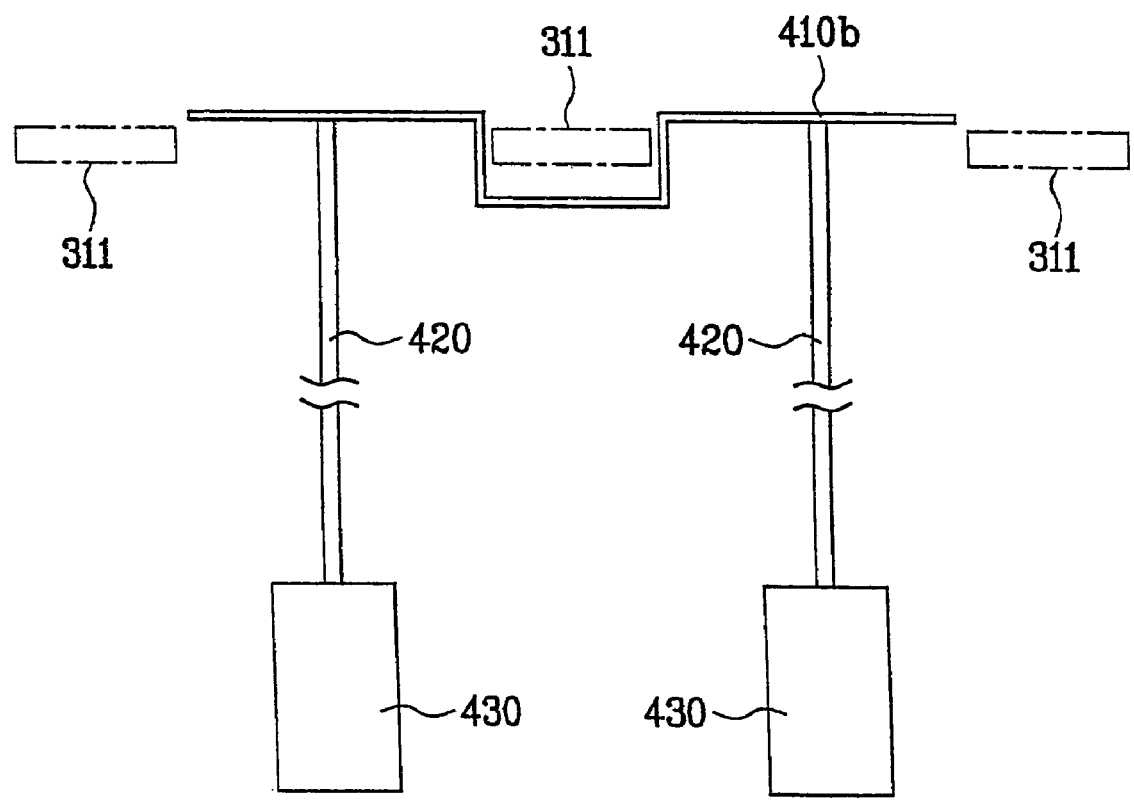
FIG. 5B is a cross sectional view of an exemplary pedestal according to the present invention.

An interval between the first support parts 410a installed to be oriented toward the same direction as the loading/unloading direction of the first substrate may be set to at least exclude an interference with a moving path of the first arm 310. For example, where the first arm 310 has three fingers at a predetermined interval (S) as shown in FIG. 4, the first support parts 410a may be placed within the interval (S), thereby excluding an interference on the movement of the first arm 310. Simultaneously, other supporting parts 410b arranged perpendicular to the loading/unloading direction of the first substrate 510 may be bent downward at portions into which each finger 311 of the first arm 310 is introduced, thereby preventing interference with each finger. Alternatively, the other supporting parts 410b may be bent downward at central portion thereof, as shown in FIG. 5B, thereby preventing interference with the center finger of the first arm 310. Both circumferential edges portions of the other supporting part 410b may be formed to have a length not to be contacted with the fingers arranged at both sides of the first arm 310 (or, the fingers arranged at both sides of the first arm are formed at an interval not to interfere with the first support part 410b), as shown in FIG. 5B.

However, if the first support parts 410a and 410b are formed longer for application to large-sized liquid crystal display, droop of both ends of the first support parts 410a and 410b may occur. Accordingly, at least two of an elevating axis 420 axially coupled with the first support parts 410a and 410b, and at least two of a driving part 430 for moving the elevating axis 420 along up and down directions may be provided at each of corresponding locations of the first and second support parts 410a and 410b. For example, each of the elevating axis 420 may be connected to corresponding driving parts 430 that are provided at a crossing portion between the first support part 410a arranged along the horizontal direction and the first support part 410b arranged along the vertical direction as viewed from the top, or a portion between the central portions of the first support parts 410a and 410b and both ends thereof. In addition, the first support parts 410a and 410b may be shaped like one of bar, round pin, and a polygonal hollow pipe. However, the first support parts 410a and 410b may be formed of any shaped so long as the provide mechanical support for the substrates.

In addition, respective faces of the first support parts 410a and 410b, including a face contacting the first substrate 510, may include a coating material (not shown) to prevent substrate damage, such as scratches caused by the contact between the first support parts 410a and 410b and the first substrate 510. The coating material may be a material such as polytetrafluoroethylene or PEEK, for example, to prevent damage of the first substrate 510, such as scratches, and be an electrically conducting material to discharge any static electricity generated on the first substrate 510.

The driving part 430 of the substrate lifting system 400 may include at least a step motor and a cylinder. The step motor may move the cylinder vertically along the direction of the elevating axis 420 using a pneumatic or hydraulic system. The driving part 430 may be fixed to a lower space at the interior of the bonding chamber 110, the driving part 430 may penetrate a bottom of the bonding chamber 110 to be fixed at a location at the exterior of the bonding chamber 110. Thus, interference between the various driving parts may be avoided, and easy installation of each of the driving parts may be provided.

Figure 6:
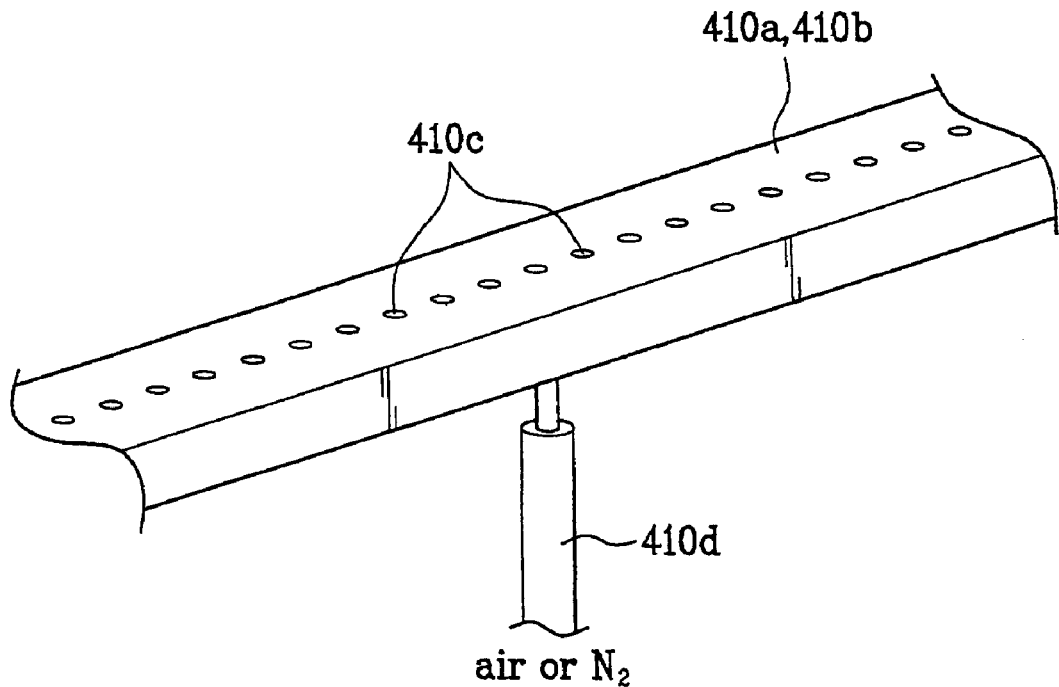
FIG. 6 is a perspective view of an exemplary support lifting system according to the present invention.

FIG. 6 is a perspective view of an exemplary support lifting system according to the present invention. In FIG. 6, a blowing system may include a plurality of blowing holes 410c for blowing air or gas to push up a substrate mounted on the first support parts 410a and 410b, and may be arranged at the first support parts 410a and 410b. A gas supply tube 410d for supplying air or gas to the blowing holes 410c may be arranged below the first support parts 410a and 410b.

Figure 7:
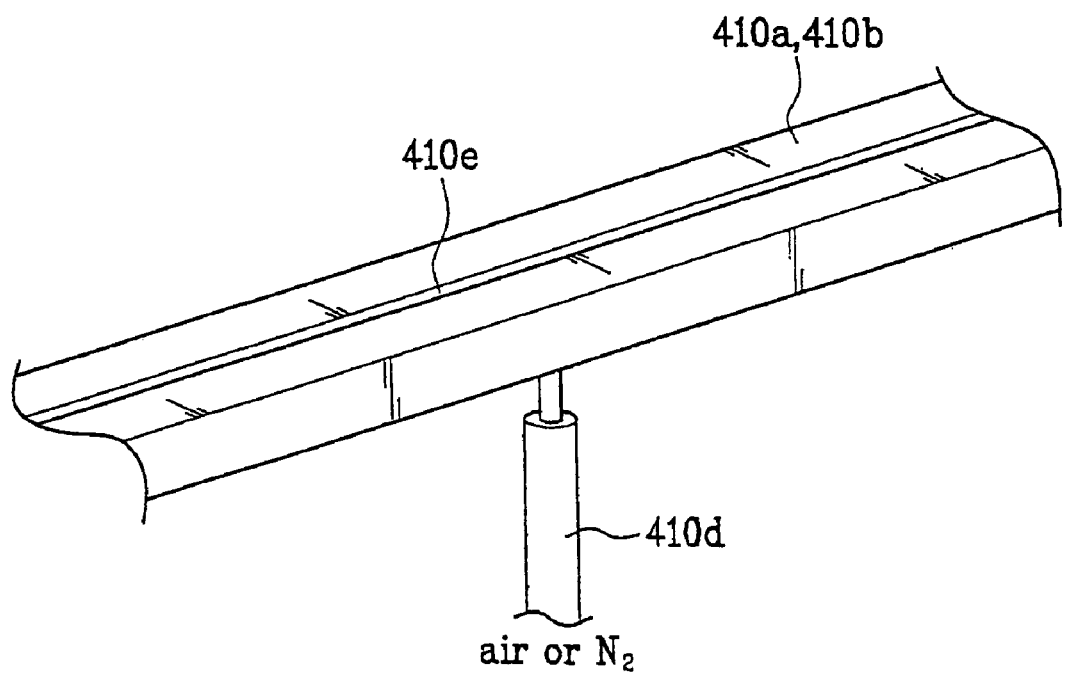
FIG. 7 is a perspective view of another exemplary support lifting system according to the present invention.

FIG. 7 is a perspective view of another exemplary support lifting system according to the present invention. In FIG. 7, a blowing system may include a blowing slit 410e for blowing air or gas to push up a substrate mounted on first support parts 410a and 410b, and may be formed at the first support parts 410a and 410b. A gas supply tube 410d for supplying air or gas to the blowing slit 410e may be arranged below the first support parts 410a and 410b.

Although not shown in the drawings, a plurality of blowing holes for blowing air or gas onto the upper surface of the lower stage 122 may be formed along with the supply tube for supplying gas or air, or vacuum holes may be formed at the upper and lower stages 121 and 122. The gas or air may be injected through the blowing holes 410c or the vacuum holes.

Figure 8:
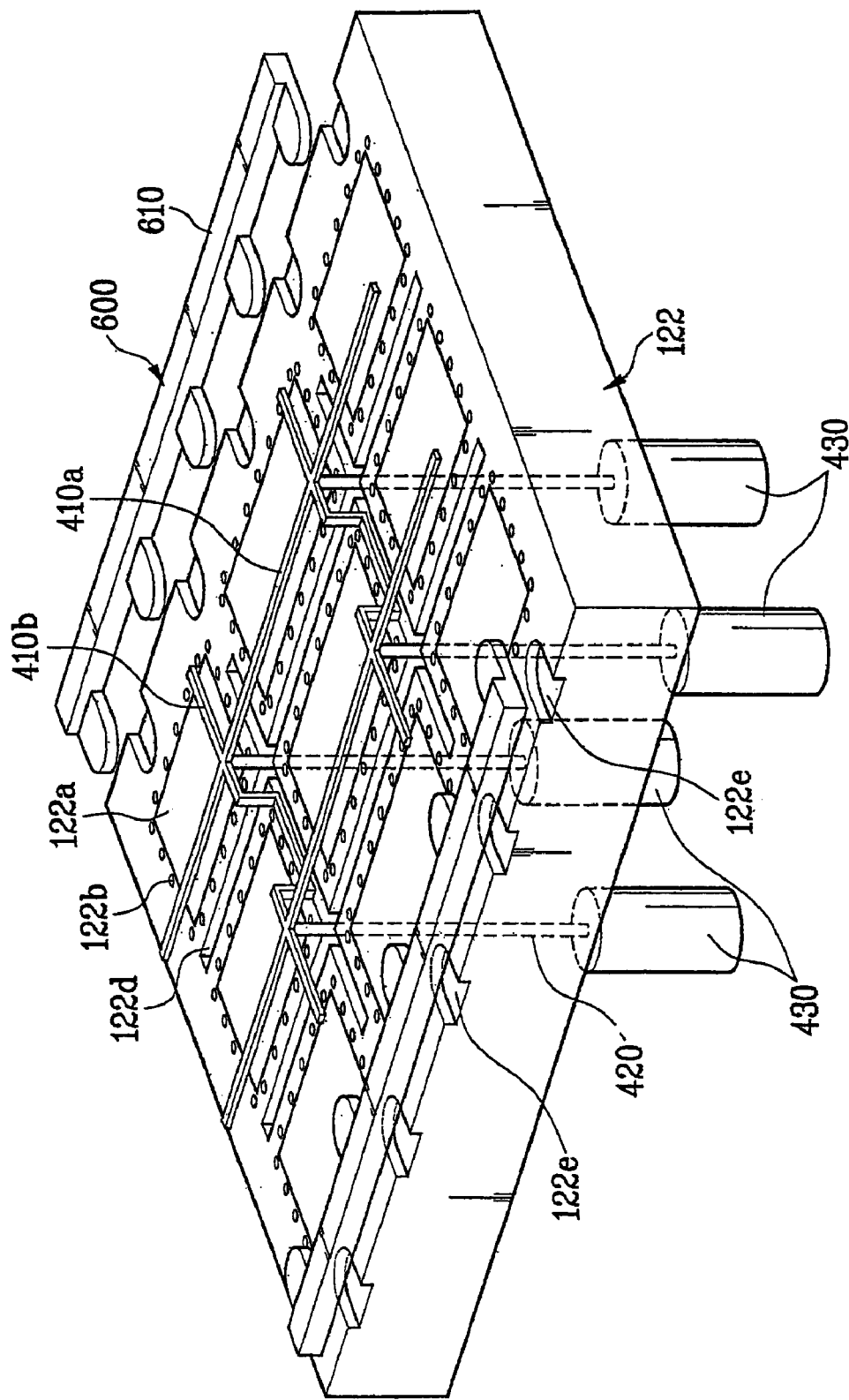
FIG. 8 is a perspective view of an exemplary lower stage, substrate lifting system, and clamping system according to the present invention.
Figure 9:
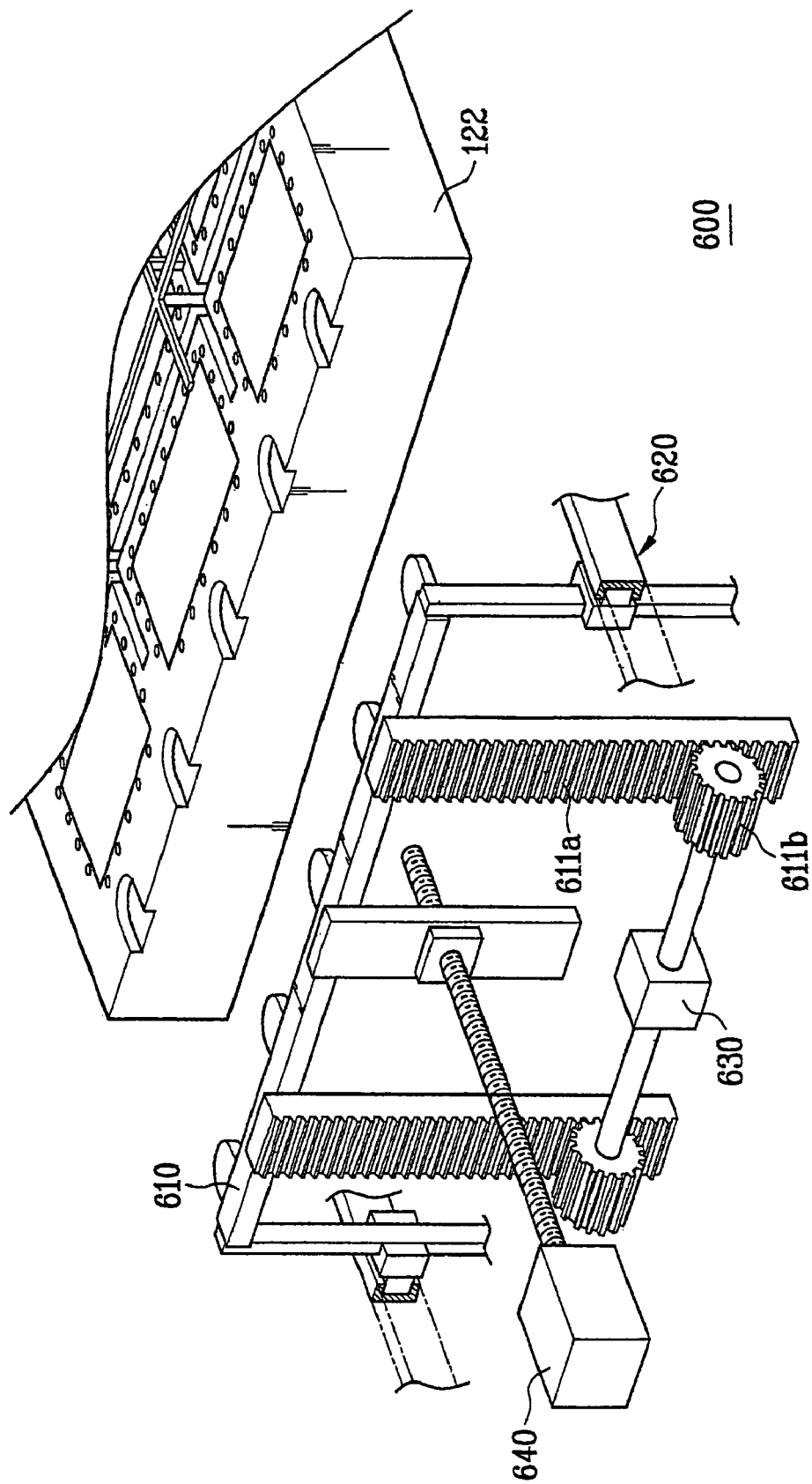
FIG. 9 is a perspective view of an exemplary clamping system according to the present invention.

FIG. 8 is a perspective view of an exemplary lower stage, substrate lifting system, and clamping system according to the present invention, and FIG. 9 is a perspective view of an exemplary clamping system according to the present invention. In FIGS. 8 and 9, a clamping system may include a second support part 610 selectively received inside at least one a second receiving part 122e recessed at both side edges of the upper surface of the lower stage 122 along a direction perpendicular to the loading/unloading direction of the substrate. The second support part 610 may be moved along the horizontal direction. One pair of racks and pinions 611a and 611b for moving the second support part 610 up and down along a Z axis direction may be arranged at both sides of the rear of the second support part 610. A first driving system (i.e., a biaxial motor 630) for transferring electric power to the racks and pinions 611a and 611b may be arranged in the interior of the bonding chamber 110 to drive the second support part 610 along the Z-axis direction. A pair of guide rails 620 for moving the second support part 610 along X-axis or Y-axis direction may be arranged in the interior of the bonding chamber 110. A second driving system 640 may be arranged in the interior of the bonding chamber 110 to move the second support part 610 in the X-axis direction along the guide rails 620.

The second receiving part 122e may be formed to have a predetermined length with respect to the substrate mounted thereon among the both edges of the upper surface of the lower stage 122. The second support part 610 may be formed to have a length corresponding to the shape of the second receiving part 122e and may push the substrate upward. The second support part 610 may be bent to have a first face supporting the bottom surface of the substrate and a second face supporting the side surface of the substrate. In addition, like the first support parts 410a and 410b, the second support part 610 that contacts the surface portions of the first substrate 510 may be coated with materials such as polytetrafluoroethylene or PEEK, for example, to prevent damage caused by the contact between the second support part 610 and the first substrate 510, and electrically conductive materials to dissipate any static electricity generated on the first substrate 510.

An exemplary process for manufacturing an LCD device using the substrate bonding apparatus according to the present invention will be described.

First, as shown in FIG. 3, the loader part 300 may control the respective arms to be given the first substrate 510 to be loaded onto the lower stage and the second substrate 520 to be loaded onto the upper stage 121. In this state, the loader part 300 may control the second arm 320 to convey the second substrate 520 upon which liquid crystal material is not dropped into the interior of the bonding chamber through an opening of the bonding chamber 110 such that a face to be bonded of the second substrate 520 is directed toward the bottom. Then, the upper stage 121 may descend downward near the conveyed second substrate 520, and the vacuum pump 123 connected with the upper stage 121 may be driven to transfer a vacuum force to the vacuum holes 121b formed in the upper stage 121, thereby adsorbing the second substrate 520 conveyed by the second arm 320. Subsequently, the upper stage 121 may ascend downward.

The loader part 300 may control the first arm 310 to convey the first substrate 510 upon which liquid crystal material is dropped on the upper surface of the lower stage 122 arranged at a lower space of the bonding chamber 110. In this state, the substrate lifting system 400 and the driving parts 430 and 530 of the clamping system 600 may be driven to move the substrate lifting system 400 and the clamping system in the upward direction. As shown in FIG. 8, the first and second support parts 410a and 410b may be gradually protruded upward from the first and second receiving parts 122d and 122e to contact the bottom surface of the first substrate 510 mounted on the first arm 310. The first and second support parts 410a, 410b and 610 may be continuously moved upward to withdraw the first substrate 510 from the first arm 310, and may stop at a specific ascending height. At this time, air or gas may be supplied to the first support parts 410a and 410b through the supply tube 410d, and then blown through the blowing holes 410c or the blowing slits 410e to push the first substrate 510 up (in FIGS. 6 and 7). To this end, although the first substrate is mounted on the first support parts 410a and 410b, direct contact of the first substrate with the upper surfaces of the first support parts 410a and 410b are avoided.

When the first substrate 510 is mounted on the upper surfaces of the first support parts 410a and 410b and contacts the upper surfaces of the first support parts 410a and 410b, internal stress may not be concentrated but may be dispersed, so that the first substrate 510 is fully supported and any displacement or droop of the first substrate 510 is avoided. Accordingly, contact between the first support parts 410a and 410b and the first substrate 510 may include one of face contacts, line contacts, and point contacts.

The first support parts 410a and 410b may be coated with a material such as polytetrafluoroethylene, PEEK, or an electrically conducting material, and the first substrate 510 is not directly contacted with the first support parts 410a and 410b by the blowing holes 410c, to prevent damage to the bottom surface of the first substrate 510 and to discharge any static electricity generated on the first substrate 510.

After the substrate elevating process, once the first arm 310 is extracted out of the bonding chamber 110 by control of the loader part 300, the driving parts 430 and 630 may withdraw the respective elevating axes in the downward direction. Then, once the first and second support parts 410a, 410b and 610 connected with the elevating axes descend and are placed into the first and second receiving parts 122d and 122, the first substrate 510 mounted on the first and second support parts 410a, 410b and 610 may be withdrawn from the first and second support parts 410a, 410b and 610, and then mounted on the upper surface of the lower stage 122.

After the extraction process and the withdrawal process, the vacuum pump that is connected to the lower stage 122 may be driven to transfer a vacuum force to the plurality of vacuum holes 122b. Accordingly, the bottom surface of the first substrate 510 is affixed to the upper surface of the lower stage 122 by the vacuum force generated by the vacuum pump. Alternatively, the substrate transfer process may include applying a potential to the electrostatic plates of the electrostatic chuck 122a of the lower stage 122, thereby affixing the bottom surface of the first substrate 510 to the upper surface of the lower stage 122. As a result, the loading process of the first and second substrates 510 and 520 are completed.

After the substrate loading process, the bonding chamber 110 may be closed and sealed, and the vacuum unit 200 may be driven to reduce a pressure of the interior of the bonding chamber 110. Then, once a desired vacuum pressure is attained, a bonding process of the first and second substrates 510 and 520 is performed by enabling the stage moving unit to move the upper stage 121 in the downward direction, or by enabling the stage moving unit to move the lower stage 122 in the upward direction.

In the aforementioned processes, once the bonding process is performed just prior to the loading process of the second substrate 520, the second arm 320 that has loaded the second substrate 520 may unload the bonded substrates placed on the upper stage 122, and such a process will be described below.

First, the substrate lifting system 400 and the clamping system 600 may be driven to move the respective first and second support parts 410a, 410b and 610 in the upward direction, whereby the bonded substrates may be separated from the lower stage 122. The upward movement of the first and second support parts 410a, 410b and 610 may continue until they are positioned at an upper space of the lower stage 122.

Likewise, gas or air may be supplied through the first supply tube 410d to the first support parts 410a and 410b and then may be blown through the blowing holes 410c or the blowing slits 410e to push the first substrate in upward direction. Accordingly, although the bonded substrates may be mounted on the first support parts 410a and 410b, direct contact of the first substrate with the upper surfaces of the first support part 410a and 410b may be avoided. Thus, static electricity and scratching of the substrate may be prevented, and impact upon the contact of the substrate and the lifting system 400 may be alleviated.

Subsequently, the loader part 300 may be controlled to again convey the second arm 320 that has loaded the second substrate into the interior of the bonding chamber 110. The loading location of the second arm 320 may be positioned at a lower portion of the bonded substrates that are moved upward by the substrate lifting system 400.

After the conveying process of the second arm 320, once the first and second support parts 410a, 410b and 610 of the substrate lifting system 400 and the clamping system 600 are moved in the downward direction, the bonded substrates mounted on the first and second support parts 410a, 410b and 610 may be transferred onto the upper surface of the second arm 320. The first and second support parts 410a, 410b and 610 may continue to move in the downward direction, and may be received inside the first and second receiving parts 122d and 122e of the lower stage 122. Afterwards, the second arm 320 may be unloaded outside the bonding chamber 110 by the control of the loader part 300, thereby completing the unloading of the bonded substrates.

Alternatively, if the unloading process of the bonded substrates is completed, loading process of the first substrate 510 may be performed by the first arm 310, the substrate lifting system 400, and the clamping system 600. Accordingly, the loading process of the first substrate 510 has been previously described and is omitted here.

Figure 10:
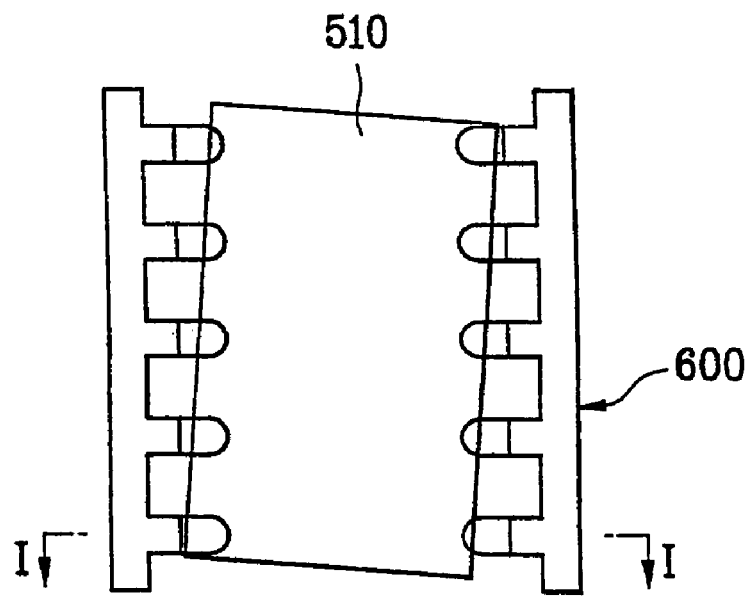
FIG. 10 is a plan view showing a misalignment of substrate with the exemplary substrate lifting system and clamping system according to the present invention.
Figure 11:
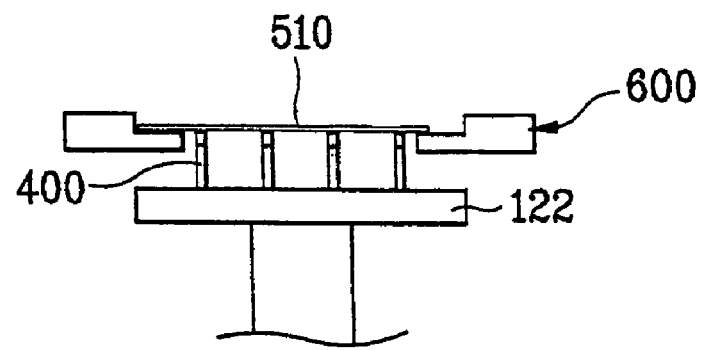
FIG. 11 is a cross sectional along I-I of FIG. 10 according to the present invention.

In a manufacturing method of an LCD, when a substrate is loaded into the lifting system 400 and the clamping system 600 from the first arm 310, misalignment may occur as shown in FIGS. 10 and 11.

FIG. 10 is a plan view showing a misalignment of substrate with the exemplary substrate lifting system and clamping system according to the present invention, and FIG. 11 is a cross sectional along I-I of FIG. 10 according to the present invention. In FIGS. 10 and 11, once the first substrate 510 is misaligned with the lifting system 400 and the clamping system 600, the first support parts 410a and 410b of the lifting system 400 is further moved along the upward direction so that the first substrate 510 is separated from the second support part 610 of the clamping system 600.

Figure 12:
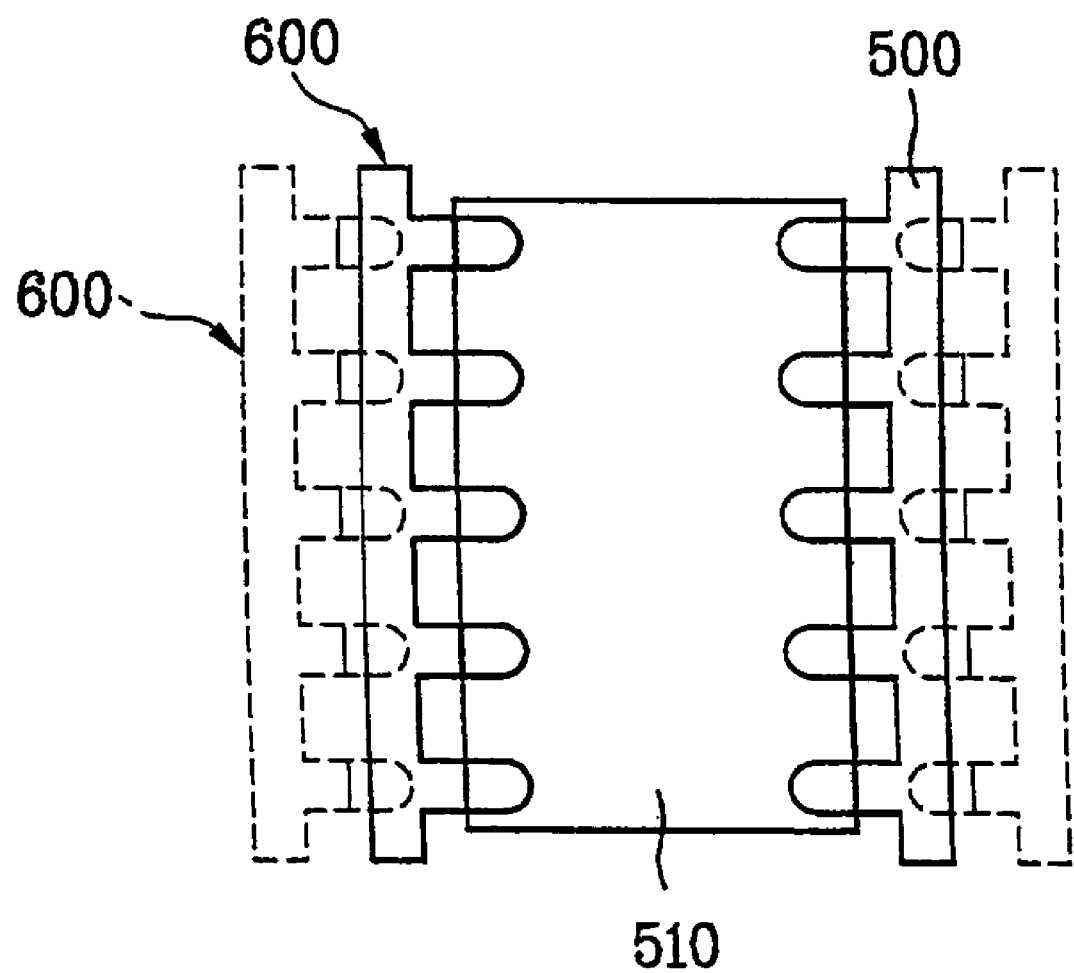
FIG. 12 is a plan view of an exemplary operation process of the substrate lifting system and clamping system according to the present invention.

FIG. 12 is a plan view of an exemplary operation process of the substrate lifting system and clamping system according to the present invention. In FIGS. 9 and 12, a motor 640 of the clamping system 600 may be driven to move the second support part 610 to a rear side of the first substrate 510. Then, a biaxial motor 630 of the clamping system 600 may be driven to move the second support part 610 up to the height of the first support parts 410a and 410b (in FIG. 8, for example) of the lifting system 600. Subsequently, the motor 640 of the clamping system 600 may be driven to forwardly move the second support part 610 toward the first substrate 510 by a first distance. Accordingly, the misaligned first substrate 510 may be aligned at a precise position.

If the blowing system formed in the first support parts 410a and 410b of the lifting system 400 blows air or gas, as described with FIG. 6, the first substrate 510 is not directly contacted with the first support parts 410a and 410b, thereby preventing scratches on the first substrate 510 and discharging any static electricity generated between the first substrate 510 and the first support parts 410a and 410b. In addition, where the first substrate 510 is positioned at the lower stage 122 and is misaligned, the motor 640 of the clamping system 600 may be driven to move the second support parts 610 to a rear side of the first substrate 510. Then, the biaxial motor 630 of the clamping system 600 may be driven to move the second support part 610 up to the height of the first support parts of the lifting system 400. Subsequently, the motor 640 of the clamping system 600 may be driven to forwardly move the second support part 610 toward the first substrate 510 by a predetermined distance. Accordingly, the misaligned first substrate 510 is aligned at a precise position.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A substrate bonding apparatus for a liquid crystal display device, comprising:
    a bonding chamber;
    lower and upper stages within the bonding chamber, the lower stage having a receiving part and penetrating holes; and
    a lifting system having a first support part selectively received within the receiving part for supporting a first substrate and a plurality of elevating axes moving up and down through the penetrating holes so that the first support part extends from a first position within the receiving part of the lower stage to a second position above an upper surface of the lower stage;
    a blowing mechanism in the first support part, having at least one opening to blow gas or air;
    a supply tube connected to the first support part to supply the gas or air to the at least one opening; and
    a blowing system to blow gas or air through the at least one opening in the first support part.

2. The apparatus according to claim 1, wherein an upper surface of the first support part is recessed from the upper surface of the lower stage at the first position.

3. The apparatus according to claim 1, wherein the first support part includes a plurality of first supports extending along a first direction and a plurality of second supports extending along a second direction perpendicular to the first direction.

4. The apparatus according to claim 3, wherein the plurality of first supports and the plurality of second supports are connected at intersections.

5. The apparatus according to claim 4, wherein the lifting system further includes a plurality of driving parts driving the plurality of elevating axis.

6. The apparatus according to claim 3, wherein each of the plurality of first supports include a pair of side portions and central portion that is offset from the side portions along a third direction perpendicular to the first and second directions.

7. The apparatus according to claim 6, wherein the central portion is disposed between adjacent ones of the plurality of elevating axes.

8. The apparatus according to claim 3, wherein the lifting system includes a plurality of second support parts each disposed along opposing side portions of the lower stage.

9. The apparatus according to claim 8, wherein each of the second support parts are positioned within second receiving parts of the lower stage.

10. The apparatus according to claim 8, wherein each of the second support parts disposed along one of the opposing side portions of the lower substrate are interconnected and each of the second support parts disposed along another one of the opposing side portions of the lower substrate are interconnected.

11. The apparatus according to claim 10, wherein each of the second support parts are disposed within recesses along the opposing side portions of the lower stage at a first position of the elevating axis, and each of the second support parts are disposed above an upper surface of the lower stage along the opposing side portions of the lower stage at a second position of the elevating axis.

12. The apparatus according to claim 1, wherein the lifting system includes a first lifting system that extends to a first position above an upper surface of the lower stage from a central portion of the lower stage and a second lifting system that extends to a second position above the upper surface of the lower stage from opposing side portions of the lower stage.

13. The apparatus according to claim 12, wherein the first lifting system retracts to a third position below the upper surface of the lower stage.

14. The apparatus according to claim 13, wherein the second lifting system retracts to a fourth position at the upper surface of the lower stage.

15. The apparatus according to claim 13, wherein the second lifting system operates simultaneously with the first substrate lifting system.

16. The apparatus according to claim 12, wherein the second lifting system includes a clamping system for clamping side portions of the first substrate.

17. The apparatus according to claim 16, wherein the clamping system includes a first driving system having a pair of rack and pinions.

18. The apparatus according to claim 16, wherein the clamping system includes a second driving system having a pair of guide rails.

19. The apparatus according to claim 18, wherein the second driving system is provided within the bonding chamber.

20. The apparatus according to claim 19, wherein the pair of guide rails align the second lifting system to the lower stage.

21. The apparatus according to claim 18, wherein the clamping system is provided within the bonding chamber.

22. The apparatus according to claim 1, wherein the at least one opening includes a plurality of holes.

23. The apparatus according to claim 1, wherein the at least one opening includes a slit.

* * * * *